R. G. LECKIE.
Separating Sulphur from its Ores.

No. 202,443. Patented April 16, 1878.

Witnesses.
E. C. Perkins.
W. J. Pratt.

Inventor.
Robert G. Leckie
by Crosby & Gregory
Attys

UNITED STATES PATENT OFFICE.

ROBERT G. LECKIE, OF ACTON VALE, QUEBEC, CANADA.

IMPROVEMENT IN SEPARATING SULPHUR FROM ITS ORES.

Specification forming part of Letters Patent No. 202,443, dated April 16, 1878; application filed November 6, 1877.

*To all whom it may concern:*

Be it known that I, ROBERT G. LECKIE, of Acton Vale, in the county of Bagot, Province of Quebec, Dominion of Canada, have invented an Improved Process for Separating Sulphur from its Ores, of which the following is a specification:

This invention has for its object to separate the sulphur from sulphur-gases (sulphurous acid and sulphide of hydrogen) formed in the roasting of ores and substances containing sulphur.

I am aware that the separation of sulphur has been attempted or effected in some degree by various methods, notably by passing the gases through incandescent carbon, or by bringing the sulphurous acid into intimate contact with carbureted-hydrogen gas; but the product of the former has been found to be much contaminated with impurities, and the latter has been found difficult and too expensive.

I am further aware that the separation of sulphur from its combination with oxygen by means of sulphureted hydrogen has long been known as a fact in chemistry, and practiced upon a small scale; but the expense of producing hydrogen sulphide by methods in use has been too expensive to admit of its application on a large scale in metallurgical operations.

By this invention, and the manner of working it as herein described, the hydrogen sulphide may be produced in large quantities at the smallest possible cost and with the minimum of labor. By the intermingling of this gas with the sulphurous acid from the oxidation of the sulphides, the sulphur is effectually precipitated in a condition almost free from impurities.

I am also aware that the sulphurous acid from the roasting of sulphurous ores has been extensively utilized by converting it into sulphuric acid; but this method is not, as a rule, economically available, as mines are frequently situated remote from manufacturing centers, and the transportation of the acid is expensive, both in packages and freight.

Sulphur, on the other hand, is easily handled, requires no expensive packages, and can be transported without danger to remote markets.

I shall now proceed to describe the apparatus and method of working it.

Figure 1:
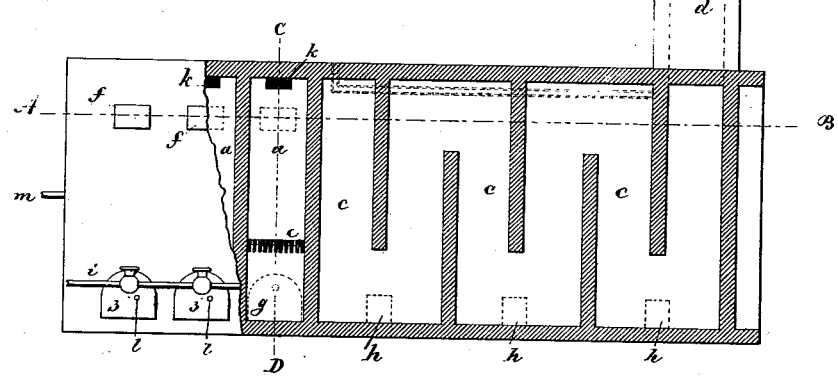
Figure 2:
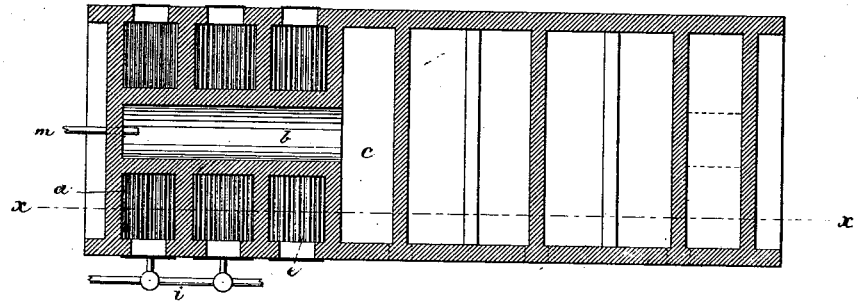
Figure 3:
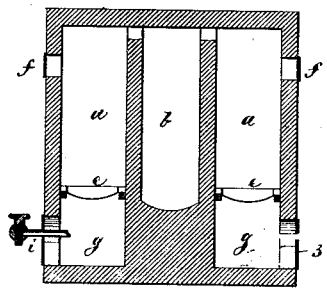

Figure 1 represents, in side elevation, partially in section on line $x\,x$, Fig. 2, an apparatus to illustrate my invention; Fig. 2, a section on line A B, Fig. 1; and Fig. 3, a section on line C D, Fig. 1.

$a\,a$ are kilns or pyrites, burners made of any suitable shape and constructed of refractory material. $b\,b$ are flues for conducting sulphur-gases, and in which the sulphurous gases and sulphureted hydrogen intermingle on their way to the chamber $c$, where the chemical reactions are completed and the sulphur precipitated according to the following chemical reaction: $SO_2 + 2H_2S = 3S + 2H_2O$.

A jet or spray of water is made to play upon the gases and vapors from the top of the chamber $c$ through a suitable pipe, 2, (see Fig. 1, dotted lines,) to facilitate condensation. The gases are further caught and condensed, if desired, in the chimney or tower $d$, which is filled with coke or other permeable material and kept moist by water introduced at top. This water may be used over and over again until it absorbs sufficient acid to be useful in some other process.

$e$ are grate-bars on which the ore is burned. $f$ are charging holes or doors for the ore; $g$, the pits or openings for discharging the ore, they being furnished with a movable iron door, 3, through which an opening, $l$, for the admission of air or an air-pipe, and also for pipe $i$, to convey superheated steam or air, such pipes being supplied in practice with any usual regulating-valves. $h\,h$ are openings for withdrawing precipitated sulphur, and also to admit any excess of water to find its way out to settling-tanks. $k$ are openings from the kilns into the flue, and $m$ is a pipe for conveying moist steam into flue $b$.

A fire having been kindled on the grate-bars $c$, fuel is put on until the kilns are thoroughly heated. The ore is then filled in, and if it contains above sixteen per cent. of sulphur then the heat generated by the burning of the sulphur will be sufficient to maintain the combustion, and no other fuel will be required. The sulphur, as it is burned, passes into the common flue *b* in the shape of sulphurous acid. When the ore is in a state of combustion—say, at a red heat—the air is shut off and superheated steam is admitted through the pipe *i*, forming sulphureted hydrogen, which, meeting and intermingling with the sulphurous acid from the adjoining kiln, causes the well-known chemical reaction already described to take place, and the sulphur is set free.

For the better and more regular working of the process, it is found preferable to supply each kiln or pyrites-burner with air and steam alternately, so that while one is producing sulphurous acid another one is producing hydrogen sulphide. At regular intervals the operation is reversed, air being shut off, and superheated steam being then supplied to one, while in the other the steam is shut off and air supplied. Where kilns are constructed in parallel rows, back to back, the superheated steam and air may be controlled by one valve for each row, so that each row of kilns may be producing sulphurous acid and sulphureted hydrogen alternately, and thus yield a steady flow of the desired gases.

When the ore is rich enough in sulphur and the air and superheated steam are properly controlled, they may be introduced simultaneously and continuously into the kiln or pyrites-burner, and the sulphurous acid and sulphureted hydrogen may be produced in such manner as to cause the reaction to take place, as already described. In so doing it is found preferable to admit the air at the bottom and the superheated steam nearer or at the top. A stream of moist steam is admitted through pipe *m* into the flue *b*, so that the free sulphur already formed may be protected from burning by any air which may find its way in.

Some of the sulphur will be collected in the flue and chamber, while the remainder will be carried out by the water, and precipitated in tanks or other suitable vessels.

If the ore or sulphur yielding substances are being roasted or burned in revolving or reverberatory furnaces, worked in pairs, the same method may be employed by alternately introducing air and superheated steam, and mixing the resulting gases in a common flue or chamber, as already described. If working a single furnace, a stream of highly-superheated steam may be continuously admitted, preferably along with heated air, and so regulated that the proper proportion of gases may be produced. An excess of air is to be avoided.

Having thus described the apparatus and manner of working, what I claim is—

1. The herein-described process of recovering sulphur from sulphur-containing ores, consisting in burning such ores, as pyrites, in separate chambers, into some of which is injected steam, and into others air, whereby sulphurous acid and sulphureted hydrogen are produced, which gases are then passed into a mixing-chamber, where they unite and liberate sulphur, which, by the exclusion of air therefrom, or by the admission of moist steam, is prevented from burning, the sulphur passing from this chamber into a condensing-chamber, where it is collected.

2. In an apparatus for roasting sulphur-bering ores, the combination, with two sets of kilns, arranged back to back, of pipes to conduct separately, at will, either superheated steam or air to the different kilns alternately, and a flue, *b*, between them, to receive sulphurous acid from one set of kilns and sulphureted hydrogen from the other set of kilns, and lead such gases through the flue *b* to the condensing-chamber, substantially as described.

In testimony whereof I have signed my name to this specification in the presence of two subscribing witnesses.

ROBERT GILMOUR LECKIE.

Witnesses:
CHARLES McLEAN,
GEO. B. WELLS.